Figure 1:
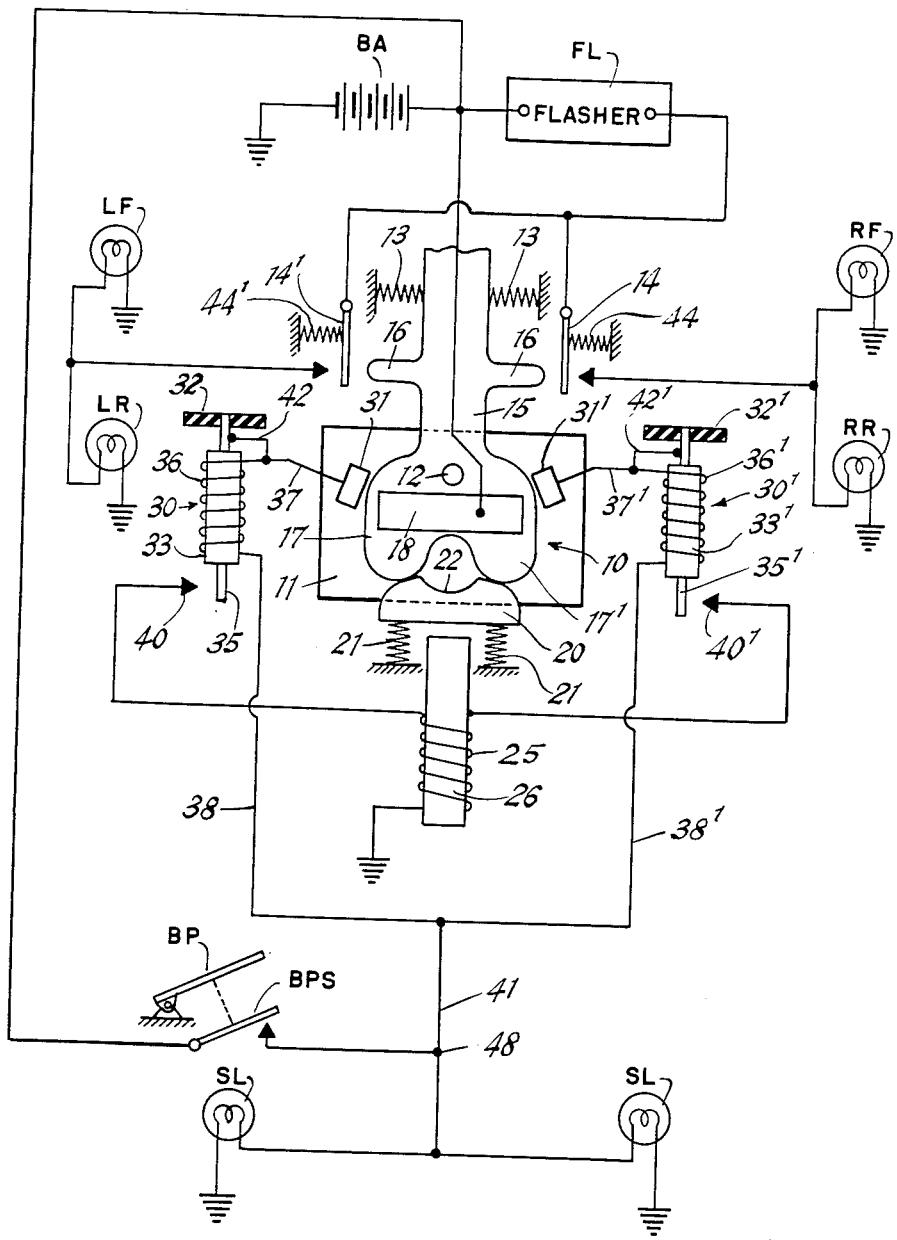

July 31, 1956  J. R. HOLLINS  2,757,315
TURN SIGNALLING ARRANGEMENT
Filed Sept. 30, 1954  2 Sheets-Sheet 1

United States Patent Office 2,757,315
Patented July 31, 1956

2,757,315
TURN SIGNALLING ARRANGEMENT

Jesse R. Hollins, Brooklyn, N. Y.

Application September 30, 1954, Serial No. 459,445

9 Claims. (Cl. 315—81)

This invention relates to turn signalling arrangements for automotive vehicles and, more particularly, to a novel turn signal selector switch releasably latched in either operated position by a magnetically released latch means under the operative control of thermostatic time delay means.

The conventional factory installed selector switch for vehicle turn signalling systems is mounted on the steering column and includes cams of friction rollers co-operable with means on the steering shaft to "cancel" the signal and restore the selector switch to neutral. As the vehicle completes the turn corresponding to the signal effected by operation of the selector switch lever, the movement of the steering shaft back toward the straight line driving position effects operation of the switch cams or friction rollers to restore the selector switch to the neutral or off position.

As usually installed, such switches require a predetermined movement of the steering wheel before the self-cancelling means are effected, the amount of requisite steering motion being almost the equivalent of that required for a full 90° turn.

When driving on high speed multi-lane roads, it is customary for the driver to signal a proposed change of lanes by using his direction signal selector switch before "cutting out" or "cutting in" relative to a line of vehicles. The amount of steering wheel movement required for such lane changes is relatively small and not sufficient to effect self-cancellation of the signal as the movement is completed. Hence, unless the driver happens to notice the continued operation of the usual signal pilot lamp, or the position of the selector switch, or hears the ticking of the flasher, the vehicle signal lamps continue to indicate a proposed turn even afer the turn has been completed. This is not only an unnecessary load on the signal system and vehicle electrical system, but also, and more importantly, is a definite safety hazard due to the resultant false signalling information given to approaching or following vehicles. Such conditions also occur when the vehicle makes less than the required amount of turn even for any reason.

For the aforementioned self-cancelling action to take place, it is necessary that the selector switch be mounted on the steering column, which is not always the most convenient location. Additionally, modifications frequently must be made to the steering column and shaft to install the self-cancelling arrangement. This has mitigated against the installation of direction signaling systems on vehicles not originally factory-equipped with such systems and, when such a system is added to a vehicle later, it is mechanically unsound to include the self-cancelling feature.

In view of the foregoing considerations, it has been proposed to provide a selector switch in which cancellation is effected by automatic timer controller means. While such a switch need not be mounted on the steering column and will be automatically restored to neutral a predetermined interval after initial operation, there are attendant disadvantages in that the signal may be cancelled before the vehicle has made its intended turning movement. For example, in heavy traffic, or at intersections, the start of the turning movement of the vehicle may be delayed for a period longer than that for which the cancellation timer is set. This is disadvantageous in that it, too, constitutes a safety hazard through failure to properly and adequately warn approaching or following vehicles of an intended turning movement.

With the foregoing in mind, the present invention is directed to a novel switch including an operator which, when moved to a switch closing position, is automatically latched therein by magnetizable latch means continuously biased to an operator latching position and moved to an operator releasing position upon energization of electromagnetic means operative upon the latch means.

Energization of the electromagnetic means is under the control of a pair of thermostatic devices, one associated with each operated position by the switch. The heating circuit of a selected one of these devices is closed responsive to movement of the switch operator to either operated position. After pre-set heating time, the energized thermostatic device effects operative energization of the electromagnetic means and the latter then attracts the magnetizable latch means to release the switch operator. Return of the latter to the neutral position breaks the heating circuit for the thermostatic device which, upon cooling, opens the circuit for the electromagnetic means.

Means preferably are provided to selectively shunt the heating circuit for the thermostatic device to delay operation of the thermostatic time delay switch opening means. As incorporated in a vehicle turn selector switch, the selective shunting may be provided by completing the circuit for the heating means for the thermostatic device through the brake-switch operated stop lamps. When the brake switch is closed, the heating circuit is effectively shunted until the brakes are released. Thus, the turn signal remains effective until after the vehicle has been in motion for a preset interval.

For an understanding of the invention principles, reference is made to the following description of typical embodiments thereof as illustrated in the accompanying drawing.

Figure 2:
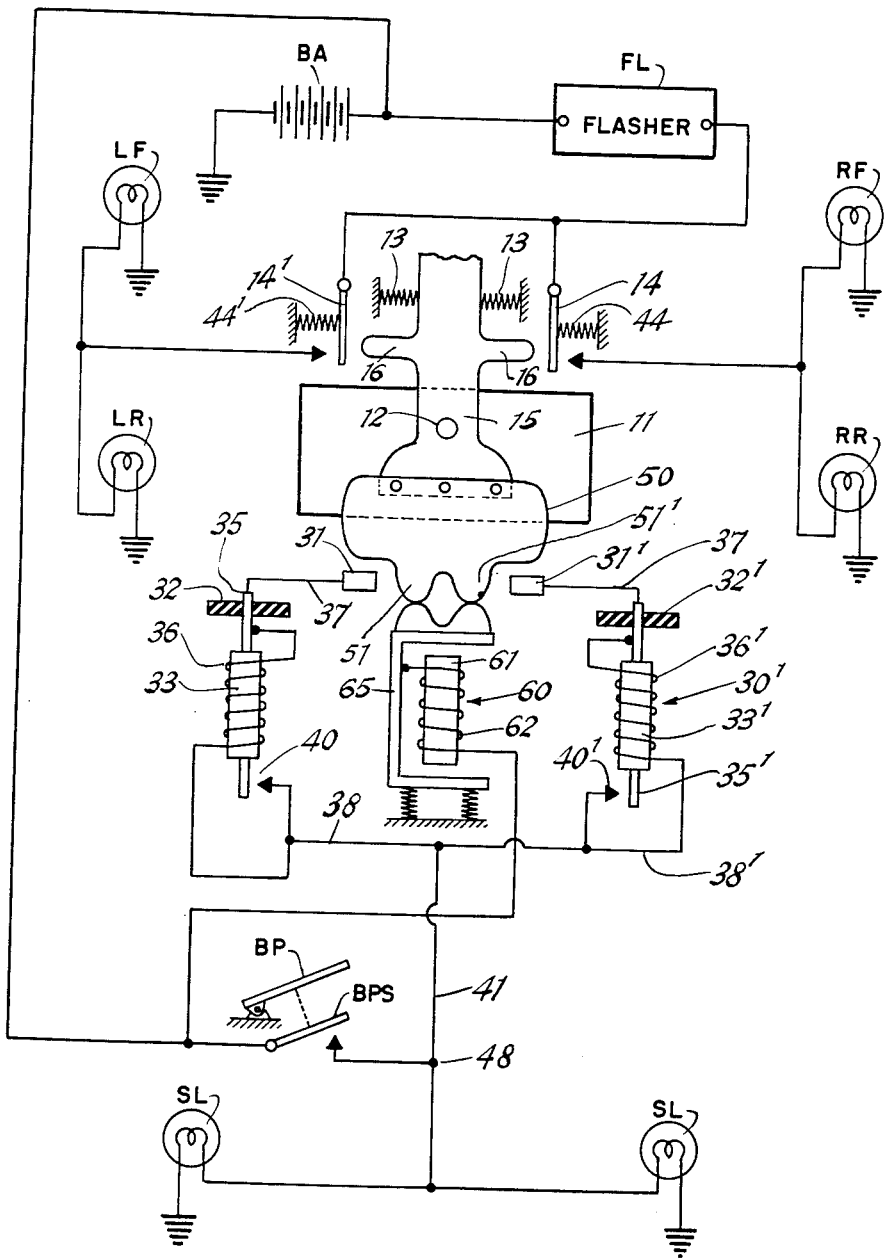

In the drawing:

Fig. 1 is a partially schematic plan view and wiring diagram of one form of vehicle turn signaling arrangement embodying the invention; and Fig. 2 is a similar illustration of another form of vehicle turn signaling arrangement embodying the invention.

Referring to Fig. 1, the invention is illustrated as incorporated in a turn signal selector switch 10 for selectively connecting grounded turn signal lamps LF, LR or RF, RR to the grounded vehicle battery through a flasher to intermittently flash the left or right signal lamps to indicate a proposed turn. The turn signal lamps may be separate units, may be extra filaments in the usual parking and tail lamps, or may be the parking and tail lamps, and are shown as separate units merely for clarity of illustration. The vehicle is also provided with the usual grounded stop lamps SL controlled by a switch BPS closed when brake pedal BP is operated.

Switch 10 includes a dielectric base 11 on which is oscillatably mounted a dielectric selector lever 15, lever 15 being pivoted to base 11 by screw or rivet 12. Springs 13 bias operator or lever 15 to the neutral position. In either selected operative position, abutments 16 on lever 15 close a selected one of a pair of switches 14, 14' each operative to connect the signal lamps on one side of the vehicle to battery BA through flasher FL said switches being normally biased to nonconnected position by springs 44, 44'. For a purpose to be described, the inner end of lever 15 is formed with a pair of spaced cam fingers or abutments 17, 17'.

Adjacent the inner end of lever 15 is a latch means 20 of magnetizable material forming the armature of a relay having an operating coil 25 and a core 26 in operative relation to latch 20. Latch 20 is biased toward lever 15 by springs 21. As lever 15 is moved to an operative position, an abutment 17 or 17' will move latch 20 toward armature 26 and will then slip into a conforming recess 22 in latch 20.

Lever 15 carries a conductive plate 18, connected to battery BA, and arranged to engage either of a pair of contact members 31, 31' in an operated position of lever 15. Contact members 31, 31' are connected in the energizing circuits of thermostatic devices 30, 30'. Each device 30, 30' includes a bimetallic strip 35, 35' fixed at one end in a dielectric mounting 32, 32'. A sleeve 33, 33', which may be of dielectric material, is placed on each strip 35, 35' and carries a high resistance heating winding 36, 36' for the bimetallic strip.

A conductor 27, 27' connects one end of each winding 36 or 36' to a contact member 31 or 31'. The opposite ends of the windings are commonly connected by conductors 38, 38', and a conductor 41, to the ungrounded sides of stop lamps SL. Branch conductors 42, 42' each connect one of the bimetallic strips 35, 35' to a contact member 31, 31'. The free end of each strip is arranged, when deflected due to heating, to engage a contact 40 or 40', these being commonly connected to one end of winding 25. The opposite end of winding 25 is grounded.

The arrangement of Fig. 1 operates in the following manner. Assuming a right turn is to be signalled, lever 15 is swung clockwise until cam abutment 17 is engaged in recess 22 of latch 20. Abutment 16 closes switch 14 against the bias of its spring 44 connecting signal lamps RF and RR to battery BA through flasher FL.

At the same time, contact plate 18 engages contact member 31 completing an energizing circuit for device 30 as follows: battery BA, plate 18, member 31, conductor 37, winding 36, conductors 38 and 41, stop lamps SL, and ground. The relatively high resistance of winding 36 restricts the current flow through lamps SL to a value insufficient to illuminate the latter. Under the heating effect of winding 36, bimetallic strip 35 deflects and eventually engages contact 40. This completes a circuit as follows: battery BA, contact plate 18, contact member 31, conductors 37 and 42, strip 35, contact 40, winding 25, and ground. Winding 25, being fully energized over a low resistance circuit, magnetizes core 26 to pull latch 20 away from lever 15 whereupon springs 13 restore lever 15 to the neutral position, disengaging plate 18 from member 31 and spring 44 biases switch 14 to open position. Lamps RF and RR are extinguished and winding 36 is de-energized and cools so that strip 35 disengages contact 40.

Should the vehicle be stationary before making the indicated turn, the heating of coil 36 is effectively delayed until the vehicle is in motion. With the vehicle stationary, brake pedal BP will be operated, closing switch BPS and energizing lamps SL. This effective shunt around coil 36 places point 48 in conductor 41 at substantially battery potential, so that both ends of coil 36 are at substantially the same potential and no current will flow through the coil. When the brakes are released, this shunt is removed, and coil 36 heats strips 35 as described.

The operation of switch 10 in signaling a left turn is similar to that just described, and it is not believed necessary to describe the same in detail.

Fig. 2 illustrates another signaling arrangement embodying the invention. In this embodiment, parts identical with those of Fig. 1 have been given the same reference characters.

Lever 15 is of dielectric material and has a conductive metal plate 50 secured to its inner end and formed with projecting cam abutments 51, 51' corresponding to the cam abutments 17, 17' of Fig. 1. A relay 60 is provided having a core 61, energizing winding 62, and an armature 65. The latter is urged by spring 66 toward lever 15 and has a latching recess engageable by fingers 51, 51'. One end of winding 62 is connected to the conductive armature 65 and the other end of winding 62 is grounded.

Assuming a right turn is to be signalled, clockwise movement of lever 15 closes switch 14 and engages finger 51 in latch recess 67. This establishes a circuit as follows: battery BA, winding 62, armature 65, finger 51 and plate 50, member 31', conductor 37', bimetallic strip 35', high resistance winding 36', conductors 38' and 41, lamps SL, and ground. Relay 30 is insufficiently energized to draw armature 65 downward, due to the high resistance of winding 36'. As winding 36' heats strip 35' sufficiently for the latter to flex and engage contact 40, winding 36' is shunted. Winding 62 of relay 60 is now fully energized so that armature 65 is pulled toward core 61, disengaging lever 15. The latter is restored to neutral by springs 13, breaking all circuits.

This arrangement differs from that of Fig. 1 in that the latching parts are included in the energizing circuits. As an altenative, plate 50 could be made of magnetic material and held against armature 65 by the small or residual magnetism of relay 60.

While specific embodiments of the invention have been shown and described in detail to illustrate the application of the invention principles, it will be understood that the invention may be embodied otherwise without departing from such principles.

What is claimed is:

1. A turn signaling arrangement for automotive vehicles equipped with a grounded source of electrical energy, said arrangement comprising, in combination, grounded right and left turn signal lamp means; a turn signal switch including a pair of normally open switch means each connected between the source and a different one of said signal lamp means; a switch operator movable from a neutral position to either of a pair of operated positions to close a selected one of said switch means; means biasing said switch operator to the neutral position; latch means engageable with said operator to releasably latch the same in either operated position of the latter; electromagnetic means operable, when energized, to actuate said latch means to release said operator; thermostatic switch means operable, after a predetermined heating interval, to connect said electromagnetic means to such source to actuate said latch means; a heating circuit for said thermostatic switch means; and circuit closure means operable by said operator in either operated position of the latter, to connect said heating circuit to such source.

2. A turn signaling arrangement for automotive vehicles equipped with a grounded source of electrical energy, said arrangement comprising, in combination, grounded right and left turn signal lamp means; grounded stop lamp means; a brake pedal operated switch operable to connect the stop lamp means to such source; a turn signal switch including a pair of normally open switch means each connected between such source and a different one of said signal lamp means; a switch operator movable from a neutral position to either of a pair of operated positions to close a selected one of said switch means; means biasing said switch operator to the neutral position; latch means engageable with said operator to releasably latch the same in either operated position of the latter; electromagnetic means operable, when energized, to actuate said latch means to release said operator; thermostatic switch means operable, after a predetermined heating interval, to connect said electromagnetic means to such source to actuate said latch means; a heating circuit for said thermostatic switch means; and circuit closure means operable by said operator in either operated position of the latter, to connect said heating circuit to such source and to the ungrounded side of the stop lamp means, whereby the heating circuit is shunted when the brake pedal operated switch is closed.

3. A turn signaling arrangement as claimed in claim 1 in which said circuit closure means includes said latch means.

4. A turn signaling arrangement as claimed in claim 1 including a flasher connected between such source and said normally open switch means.

5. A turn signaling arrangement as claimed in claim 1 in which said circuit closure means includes a contact strip carried by said operator and a contact member connected to said heating circuit and engaged by said plate in an operated position of said operator.

6. A turn signaling arrangement as claimed in claim 1 in which said thermostatic switch means comprises a pair of thermostatic switches connected in parallel to said electromagnetic means and each having a heating circuit closed in a different operated position of said operator.

7. A turn signaling arrangement as claimed in claim 6 in which each thermostatic switch includes a thermostatic element in circuit with said circuit closure means and engageable with a contact connected to said electromagnetic means after such predetermined heating interval.

8. A turn signaling arrangement as claimed in claim 3 in which said circuit closure means connects said heating circuit to such source through an energizing coil of said electromagnetic means.

9. A turn signaling arrangement as claimed in claim 8 in which said thermostatic switch means, when closed, shunts said heating circuit.

References Cited in the file of this patent
UNITED STATES PATENTS

| | | |
|---|---|---|
| 1,178,873 | Potter | Apr. 11, 1916 |
| 2,069,895 | Melvin | Feb. 9, 1937 |
| 2,122,508 | Bell | July 5, 1938 |
| 2,450,370 | Clive | Sept. 28, 1948 |